United States Patent [19]
Nix et al.

[11] Patent Number: 5,337,694
[45] Date of Patent: Aug. 16, 1994

[54] TRIM APPARATUS FOR OUTBOARD MOTOR

[76] Inventors: Charles D. Nix, 1578 Slaughter Rd., Madison, Ala. 35758; Johnny P. Baker, 782 Burwell Rd., Harvest, Ala. 35749; William F. Huntley, 206 Wellington Rd., Athens, Ala. 35611

[21] Appl. No.: 32,440

[22] Filed: Mar. 16, 1993

Related U.S. Application Data

[63] Continuation of Ser. No. 840,550, Feb. 25, 1992, abandoned.

[51] Int. Cl.⁵ ............................................. H01R 39/00
[52] U.S. Cl. ................................. 114/144 R; 439/15; 439/245; 74/484 H; 74/480 B
[58] Field of Search ............... 137/352, 899.2; 116/26, 116/59; 340/388, 390, 398; 74/484 R, 484 H, 492, 494 R; 180/78; 114/144 R, 144 E, 154, 160, 144 A; 439/15, 245, 840, 841

[56] References Cited

U.S. PATENT DOCUMENTS

| Re. 27,932 | 2/1974 | Mettetal | 440/61 |
|---|---|---|---|
| 4,744,763 | 5/1988 | Suzuki | 439/15 |
| 4,844,359 | 7/1989 | Kato | 439/15 |
| 4,943,240 | 7/1990 | Karlsson | 439/15 |
| 5,010,784 | 4/1991 | Nakazato | 74/492 |
| 5,049,082 | 9/1991 | Carter | 439/15 |

FOREIGN PATENT DOCUMENTS 1112682 5/1989 Japan .................. 439/15

Primary Examiner—Robert J. Oberleitner
Assistant Examiner—Clifford T. Bartz
Attorney, Agent, or Firm—John C. Garvin, Jr.

[57] ABSTRACT

A kit for locating on the steering wheel of a watercraft a switch assembly for operating actuating mechanisms for tilting upwardly or downwardly the outdrive of a motor associated with the watercraft to enable the operator of the watercraft to keep both hands on the steering wheel especially when the watercraft is travelling at a high rate of speed. The kit comprises a switch assembly for mounting on the steering wheel; a cable reel assembly having a rotary housing and a stationary housing mounted to the vehicle; and a wiring harness having a first end electrically connected to the switch assembly, an intermediate section fixed to the rotary housing and coiled into a plurality of convolutions within a chamber in the stationary housing for expansion within the chamber if the steering wheel is turned in one direction and contraction within the chamber if the steering wheel is turned in the other direction, and being operatively connected to the actuating mechanisms which causing the tilting of the motor.

3 Claims, 4 Drawing Sheets

TRIM APPARATUS FOR OUTBOARD MOTOR

This application is a continuation of Ser. No. 07/840,550 filed Feb. 25, 1992, now abandoned.

TECHNICAL FIELD

This invention relates to a kit for locating or relocating a portion of the actuating mechanism for tilting the outdrive of an outboard and/or inboard-outboard motor for a boat to the steering wheel of the boat. More particularly, this invention relates to a kit for locating or relocating to the steering wheel a portion of the actuating mechanism which tilts or trims the outdrive of an outboard and/or inboard-outboard motor mounted on the transom of a boat to enable the driver of the boat to keep both hands on the steering wheel especially when the boat is travelling at a high rate of speed.

BACKGROUND OF THE INVENTION

The prior art abounds with power-operated mechanisms for tilting outboard and/or inboard-outboard motors mounted on the transom of a boat. These power-operated mechanisms are useful to avoid damaging the propeller and the engine when docking or beaching a boat in shallow water and when operating the boat through weed beds. These power-operated mechanisms are also useful to raise and lower the larger and heavier high-powered outboard motors which are extremely difficult to handle manually and for holding the foot of the outboard motor in a raised position when the boat is positioned on a trailer for towing by a land motor vehicle. These power-operated mechanisms are especially useful to tilt or trim the outdrive of the motor to its most efficient angle relative to the transom of the boat to achieve peak performance of the motor and the boat irrespective of the distribution of weight within the boat.

The switches for actuating the power-operated mechanisms for raising and lowering the outdrive of outboard motors mounted on the transom of a boat are almost universally positioned on the upper end of a control lever, mounted on the sidewall of the boat on one side of the operator (driver), which operates both the throttle linkage and the transmission of the outboard motor. The high powered motors being installed on boats used by professional bass fishermen and others who like to travel at high rates of speed are likewise normally mounted on the upper end of the control lever so located. Since the operator of the boat must remove one hand from the steering wheel to actuate one of the switches to trim the motor either up or down to reach peak performance, a dangerous and hazardous situation is created. Thus, it is desirable to relocate the switches to the steering wheel so that the operator will not have to remove one of his hands from the steering wheel when the boat is travelling at high rates of speed.

U.S. Pat. No. Re. 27,932 to Mettetal, Jr. discloses several embodiments of typical, prior art, mechanisms for tilting an outboard motor, namely: a combination hydraulic and electrical circuit mechanism (FIGS. 1–4); a hydraulic mechanism (FIGS. 5–7); and a mechanical screw and nut mechanism (FIGS. 8–10). The present invention is adaptable for use with any of these types, or any other types, of mechanisms for tilting the outdrive of a motor.

Several kits are on the market for relocating the actuating switches to places such as the steering wheel, dashboard or the floor of the boat. Examples of such kits are depicted on pages 7 and 8 of the 1989/1990 Catalog of T-H Marine Supplies, Inc., 118 Celtic Circle, Madison, Ala. These kits have several disadvantages, deficiencies or drawbacks. The kit for relocating the switch to the steering wheel has the disadvantage or drawback in that the cable leading from the switches to the power trim wiring harness coils or wraps around the steering column or shaft when the steering wheel is rotated. For safety reasons, it is therefore desirable to provide switches adapted for mounting on the steering wheel to enable the operator of the boat to trim the outdrive of the motor while traveling at a high rate of speed without having to take his hands off of the steering wheel.

It is an object of the present invention to provide a relative inexpensive kit for locating or relocating on the steering wheel the switches of a power-operated mechanism which tilts or trims the outdrive of a motor for a boat.

It is a further object of the present invention to provide the power-operated mechanisms which causes the tilting or trimming of the outdrive of a motor for a boat with means located on the steering wheel to cause such tilting or trimming.

It is another object of the present invention to locate on the steering wheel of a steerable vehicle the switch assembly which energizes a component of the vehicle which affects the operation of the vehicle.

Additional benefits and advantages of the present invention will become apparent to those skilled in the art to which this invention relates from the subsequent description of the preferred embodiments and the appended claims, taken in conjunction with the accompanying drawings.

DESCRIPTION OF THE PREFERRED EMBODIMENTS

Figure 1:
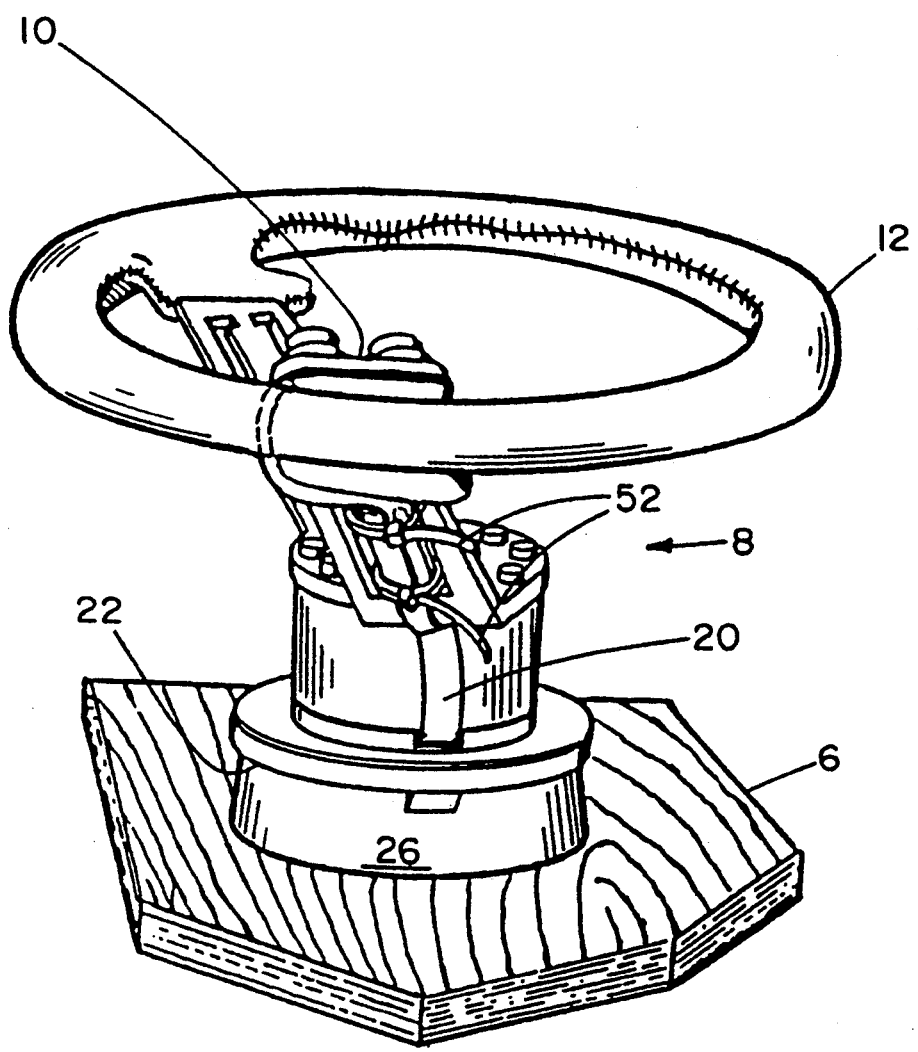
FIG. 1 is an perspective view showing the kit portion of the actuating mechanism of the present invention shown mounted on the steering wheel, steering column and dashboard of a boat (not shown).

FIG. 1, illustrates by way of example, a dashboard 6 having an opening 7 (FIGS. 2 and 3) of a conventional boat (not shown), the kit 8 of the present invention, and a switch assembly 10 mounted upon the steering wheel 12 of a boat (not shown).

Figure 2:
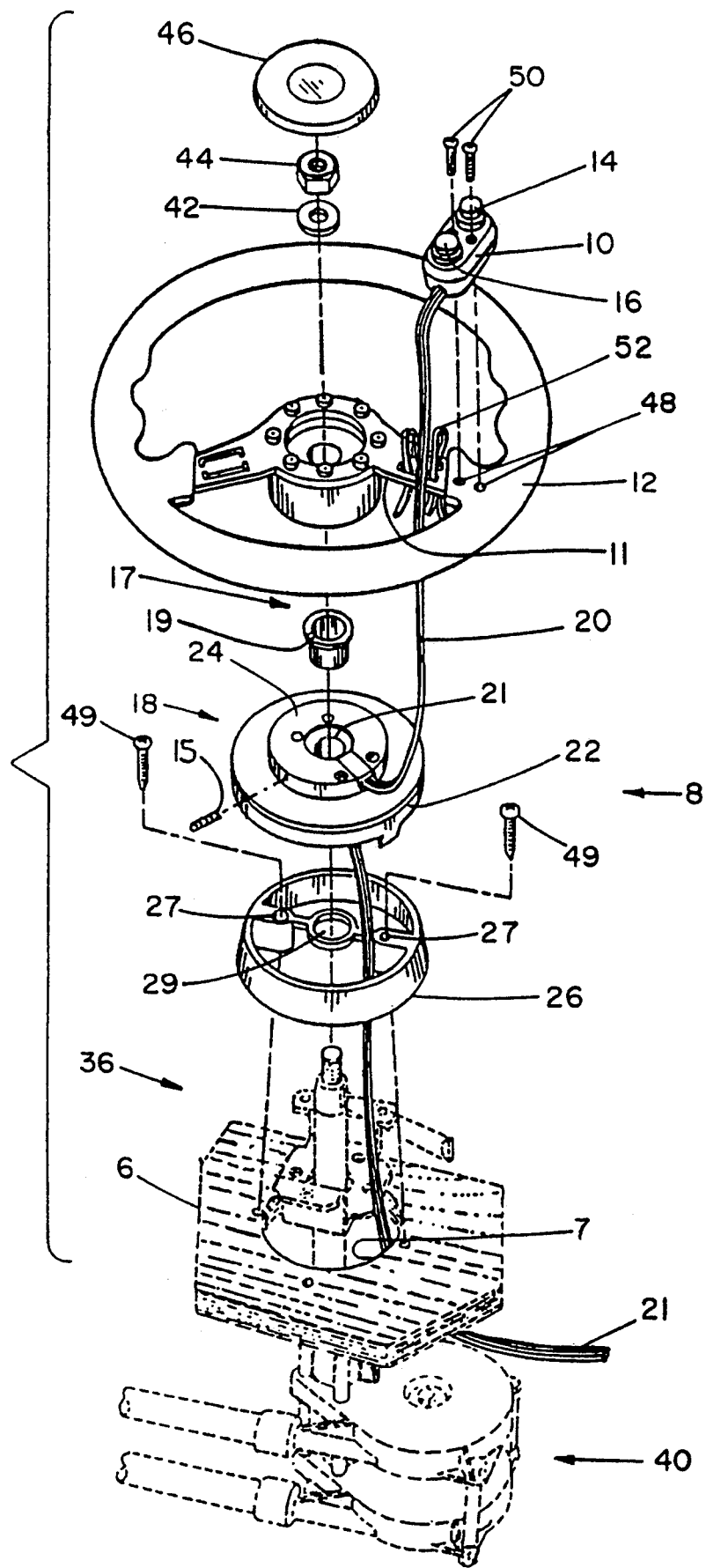
FIG. 2 is a perspective, exploded, view of the typical mounting of the kit portion of the actuating mechanism of the present invention adapted for use with the TELEFLEX® rack and pinion and MORSE CONTROLS® rotary steering shaft output systems.
Figure 6:
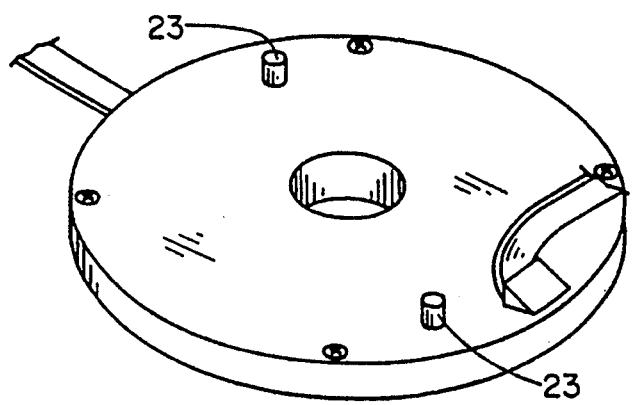
FIG. 6 is a perspective bottom (underside) view of the cable reel assembly.
Figure 5:
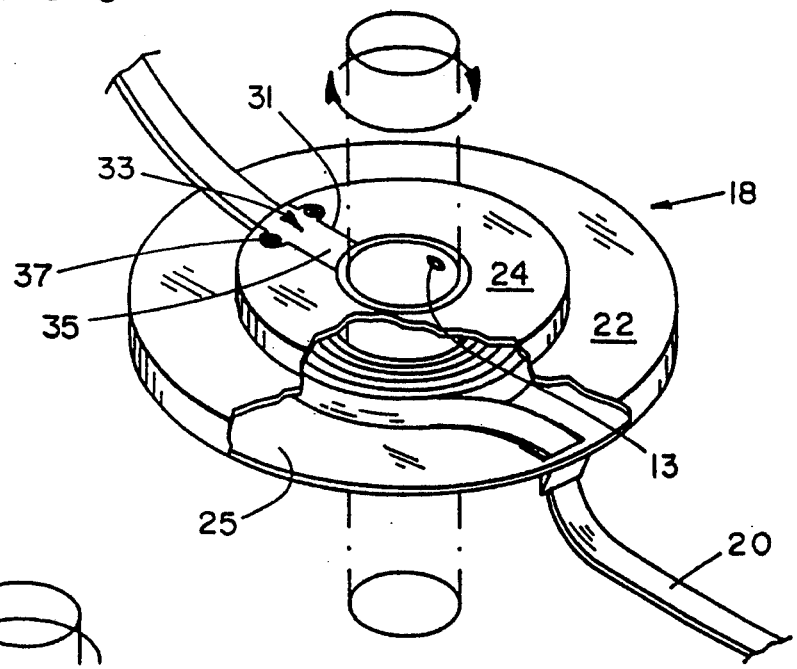
FIG. 5 is a partially broken away perspective view of the cable reel assembly incorporated in the present invention showing the wiring harness in its tightly coiled, contracted, condition.

FIG. 2 illustrates the kit 8 in an exploded, perspective, view as used with a TELEFLEX® rack and pinion or MORSE CONTROLS® rotary steering shaft output system 40 (partially shown in dotted lines). As shown in FIG. 2, kit 8 includes a switch assembly 10, a reducing bushing 17, a cable reel assembly 18, a bezel base mount 26 having a pair of openings 27 and a central locating hole 29, a continuous multi-conductor wire (a three piece conductor wire is shown in the drawings) or wiring harness 20 adapted for connection at one of its ends to switch assembly 10 and at its other end 21 to the wires (not shown) of conventional mechanisms (not shown) for trimming the outdrive of the motor (not shown), a conventional steering shaft and housing assembly 36, and either a TELEFLEX® rack and pinion or MORSE CONTROLS® rotary steering shaft output system 40. Switch assembly 10 has two buttons 14 and 16 in electrical contact with continuous multi-conductor wire 20, button 14 being adapted to cause the outdrive (not shown) of the motor or engine to tilt (trim) upwardly and button 16 being adapted to cause the outdrive (not shown) of the motor or engine to tilt (trim) downwardly. Cable reel assembly 18 includes a fixed housing 22 and a rotary housing 24. Fixed housing 22 includes a hollow chamber 25 (FIGS. 4 and 5) adapted for receiving in the order of seven to eleven convolutions or coils of the multi-conductor wire 20 wound therein to enable the wire 20 to be moved between its loosely coiled, expanded, condition as shown in FIG. 4 to its tightly coiled, contracted, condition as shown in FIG. 5. For illustrative purposes, FIG. 4 shows only four convolutions of wire 20 in its loosely coiled, expanded, condition and FIG. 5 shows only five convolutions of wire 20 in its tightly coiled, contracted condition. However, it has been found that eight to ten convolutions are normally adequate for proper operation. The expanded condition (FIG. 4) and the contracted condition (FIG. 5) of conductor wire 20 generally represent the conditions of the coils of wire 20 when steering wheel 12 has been rotated to its two extreme positions. An opening 31 (FIGS. 4 and 5) is provided in the top of rotary housing 24 for the passing therethrough of wiring harness 20. As seen in FIGS. 2, 3, 4 and 5, the opening 31 is shown to extend radially across the top of the rotary housing and communicates with the interior thereof. The wiring harness extends from the exterior of the rotary housing, through opening 31 and into the hollow chamber 25 of fixed housing 22. As can be seen in FIGS. 2, 3, 4, and 5, the openings 31 serves as a guide passageway to direct the cable transversely across the housing in a direction which is normal to the rotational axis of the rotational housing. A clamp 33 (FIGS. 4 and 5) is provided for fitting wit a portion of the opening in rotary housing 24 for securing or clamping an intermediate portion of wiring harness 20 to rotary housing 24. Clamp 33 includes a plate 35 which fits in opening 31 and is secured therein by screws 37. A set screw 15 is mounted within a partially threaded opening 13 in the upper portion of rotary housing 24 for a purpose to be explained later. A pair of bosses 23 (FIG. 6) protrudes from the bottom of fixed housing 22 for a purpose to be explained later.

As set forth above, FIG. 2 illustrates kit 8 as used with a conventional TELEFLEX® rack and pinion and MORSE CONTROLS® rotary steering shaft output system 40 (partially shown in dotted lines). The procedure for mounting kit 8 of the present invention for use with a conventional TELEFLEX® rack and pinion output system 40 or a MORSE CONTROLS® rotary steering shaft output system 40 is as follows:

a. The steering wheel 12 (with all steering mechanisms including steering shaft and housing assembly 36 and shaft output system 40 connected to the engine) is rotated to the right or clockwise to a stop position.

b. With steering wheel 12 so positioned, the hardware (washer 42, nut 44, and cover 46), steering wheel 12, and the conventional bezel (not shown) are removed from operational engagement with steering shaft and housing assembly 36.

c. Base mount 26 is slid and positioned over steering shaft and housing assembly 36 and anchored to dashboard 6 by screws 49 which pass through openings 27 of base mount 26. [Reducing bushing 17 must be placed within central locating hole 29 of base mount 26, for centering purposes during installation when used with steering shaft output systems having a steering shaft of reduced diameter (less than one inch) such as MORSE CONTROLS® rotary system, with reducing bushing 17 being removed after base mount 26 is anchored to dashboard 6. The size of the steering shaft dictates whether reducing bushing 17 must be used in the installation process. When used with MORSE CONTROLS® rotary systems, the two tangs (not shown) used to mount the conventional bezel (not shown) must be removed from the steering shaft and housing assembly 36 either by cutting or filing for a proper fit of base mount 26.]

d. Cable reel assembly 18 is placed over the steering shaft of steering shaft and housing assembly 36, the free end 21 of wiring harness 20 is then passed under dashboard 6 through either holes (not shown) drilled in dashboard 6 or through the clearance inside of opening 7 in dashboard 6, and the protruding bosses 23 (FIG. 6) on the bottom of fixed housing 22 of cable reel assembly 18 are then inserted into openings 27 of base mount 26 to thus prevent relative rotational movement between base mount 26 and fixed housing 22.

e. With cable reel assembly 18 mounted on top of base mount 26, rotary housing 24 of cable reel assembly 18, along with the wire 20 and switch assembly 10, is turned to the right or clockwise until it is tight, and then turned to the left or counter clockwise approximately one eighth of a turn so that it will line up with a position where the spoke 13 of the steering wheel 12 will be at when later installed. [The adapter bushing 17 must then be reinserted in opening 21 in cable reel assembly 18, with slot 19 of adapter bushing 17 being aligned with set screw 15 in rotary housing 24 so that set screw 15 can pass through slot 19, at which time set screw 15 is tightened to secured rotary housing 24 to the steering shaft of steering shaft and housing assembly 36 for rotation therewith.

f. The steering wheel 12 is then replaced using the hardware (washer 42, nut 44, and cover 46) previously removed.

g. The switch assembly 10 is then routed around the bottom edge of spoke 13 of steering wheel 12 to the desired mounting position on the outer perimeter of steering wheel 12.

h. Two holes 48 are then drilled in steering wheel 12 and the switch assembly 10 is secured by two countersunk screws 50.

i. The conductor wire 20 is then mounted along the bottom of spoke 13 of steering wheel 12 and secured by cable ties 52.

j. The end 21 of wiring harness 20 is then appropriately connected to the conventional three piece wire (not shown) leading to the trim mechanism for the motor (not shown).

Figure 3:
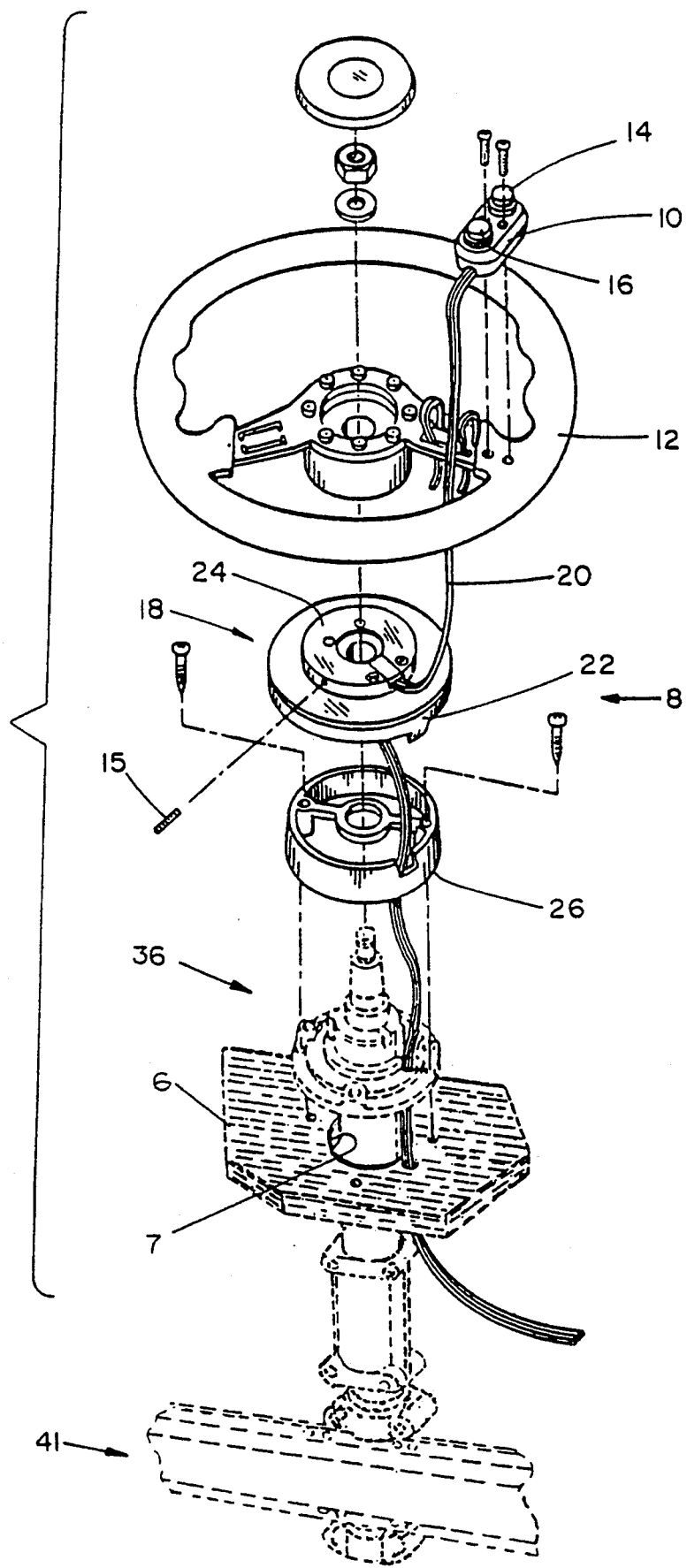
FIG. 3 is a perspective, exploded, view of the typical mounting of the kit portion of the actuating mechanism of the present invention adapted for use with the TELEFLEX® rotary and MORSE CONTROLS® rack and pinion steering shaft output systems.
Figure 4:
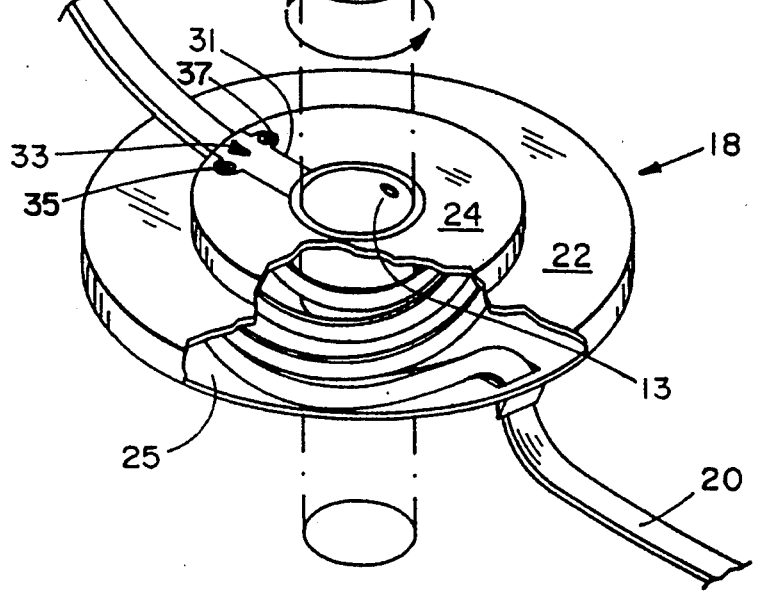
FIG. 4 is a partially broken away perspective view of the cable reel assembly incorporated in the present invention showing the wiring harness in its loosely coiled, expanded, condition.

FIG. 3 illustrates the kit 8 in an exploded perspective view as used with a TELEFLEX ® rotary or MORSE CONTROLS ® rack and pinion steering shaft output system 41 (partially shown in dotted lines). The components of kit 8 as illustrated in FIG. 3 differ from those as illustrated in FIG. 2 only in the bezel mount 26 and the nonuse of adapter bushing 17. This is due to the fact that the steering shafts associated with the output system 41 (FIG. 3) is larger in diameter than the steering shafts associated with the output system 40 (FIG. 2). The procedure for mounting kit 8 when used with a TELEFLEX ® rotary or MORSE CONTROLS ® rack and pinion steering shaft output systems 41 as illustrated in FIG. 3 is identical to that discussed above for steering shaft output systems 40 (FIG. 2) except for the nonuse of the adapter bushing 17.

As is apparent, the kit 8 of the present invention is adaptable for use with any steerable vehicle which might control actuation means of all sorts which affect the operation of the vehicle. For example, kit 8 might be used in cruise control systems and carburetor systems which affect the operation of the vehicle.

As is also readily apparently, wiring harness 20 can include conductors in excess of the three shown in the drawings for controlling additional elements commonly found in vehicles such as horns, radios, and lights. With additional conductors, it is also readily apparent that additional switches could be added to switch assembly 10.

As is further readily apparent, the kit 8 of the present invention is also adaptable for use with steering shaft output systems for watercraft other than those steering output systems specifically identified herein.

While the above description constitutes a preferred embodiment of the present invention, it will be appreciated that the invention is susceptible to modification, variation and change without departing from the proper scope and fair meaning of the accompanying claims.

I claim:

1. In a steerable vehicle having a dashboard and steering means including a rotatable shaft extending through said dashboard, said rotatable shaft having a steering wheel secured thereto; propulsion means for propelling said vehicle; and actuation means operable to affect the operation of said vehicle; a kit disposed for mounting in said vehicle for energization of said actuation means, said kit comprising:

switch means mountable on said steering wheel for movement therewith;

a cable reel assembly including a rotary section and a stationary section each having a chamber therein; said rotary section having a top and an outer surface; said stationary section being rigidly mounted to said dashboard, said rotary section being secured to said rotatable shaft for rotational movement therewith and having an opening extending between said outer surface and said chamber, said opening defining a radially disposed cable passageway for directing said cable into said chamber of said rotary section in a path which is substantially normal to said rotational shaft;

wiring harness means having first and second end portions and an intermediate coiled portion, said first end portion being connected to said actuation means operable to affect the operation of said vehicle, said intermediate coiled portion being disposed for expansion or contraction in said stationary section of said cable reel assembly responsive to rotation of said rotatable shaft, said wiring harness means having a portion adjacent said intermediate portion positioned in and extending through said opening and into the interior of said rotary section;

a base adapted for attachment to said dashboard and disposed for supporting said stationary section of said cable reel assembly; and clamp means for securing said wiring harness means adjacent its said intermediate coiled portion to said rotary section of said cable reel assembly;

said stationary section of said cable reel assembly including a hollow chamber and said intermediate coiled portion of said wiring harness means being wrapped into a plurality of convolutions within said hollow chamber, whereby said convolutions expand when said steering wheel is rotated in a first direction and contract when said steering wheel is rotated in a second direction.

2. Apparatus as set forth in claim 1 wherein said opening radially extends across the top of said rotary housing and communicates with the interior thereof, and said clamp means includes a plate adapted for fitting into said opening of said rotary section and engaging said wiring harness means, and means for securing said plate to said rotary section for secured relation of said wiring harness to said rotary section.

3. Apparatus as in claim 2 wherein said vehicle is a water craft, said propulsion means includes a lower outdrive unit and said actuation means is a power trim means for raising and lowering said outdrive unit.

* * * * *